United States Patent [19]
Waldrop

[11] Patent Number: 6,079,194
[45] Date of Patent: Jun. 27, 2000

[54] REEL DRIVE SHAFT FOR WINDROW PICKUP ATTACHMENT

[75] Inventor: T. William Waldrop, New Holland, Pa.

[73] Assignee: New Holland North America, Inc., New Holland, Pa.

[21] Appl. No.: 09/153,792

[22] Filed: Sep. 15, 1998

Related U.S. Application Data

[60] Provisional application No. 60/059,069, Sep. 16, 1997.

[51] Int. Cl.[7] .......................... A01D 43/02; A01D 57/00; A01D 89/00
[52] U.S. Cl. ................................ 56/364; 56/220
[58] Field of Search ........................... 56/341, 364, 14.4, 56/16.4 R, 220; 100/88

[56] References Cited

U.S. PATENT DOCUMENTS

| | | | |
|---|---|---|---|
| 1,733,839 | 10/1929 | Taylor | 56/16.4 R |
| 1,939,385 | 12/1933 | Burr | 56/364 |
| 2,506,980 | 5/1950 | Verger | 56/364 |
| 2,515,343 | 7/1950 | Gravely | 56/220 |
| 3,555,796 | 1/1971 | Baumeister | 56/221 |
| 3,664,101 | 5/1972 | Hurlburt | 56/220 |
| 3,722,194 | 3/1973 | Halls | 56/226 |
| 3,724,183 | 4/1973 | Hurlburt | 56/220 |
| 4,068,454 | 1/1978 | Webb | 56/220 |
| 4,223,846 | 9/1980 | Priepke | 241/60 |
| 4,464,890 | 8/1984 | Scholtissek et al. | 56/364 |
| 4,495,756 | 1/1985 | Greiner et al. | 56/364 |

*Primary Examiner*—Thomas B. Will
*Assistant Examiner*—Meredith C Petravick
*Attorney, Agent, or Firm*—Frank A. Seemar; Larry W. Miller; J. William Stader

[57] ABSTRACT

A windrow pickup attachment for a forage harvester having an input opening for receiving crop material. The attachment includes a main frame positioned on the front of the forage harvester adjacent the input opening with a transverse reel assembly and an auger conveyor mounted on the main frame for picking up crop material from the ground, consolidating it and conveying it to the forage harvester base unit via the input opening. A drive shaft for the reel assembly includes a pair of outwardly disposed rigid elements affixed to an intermediate rigid element. Opposing bearing assemblies support the drive shaft on the main frame in the vicinity of the outer ends of the outwardly disposed rigid elements. The shaft is also supported by an intermediate support bracket that extends from the main frame between the elements of the reel.

5 Claims, 3 Drawing Sheets

REEL DRIVE SHAFT FOR WINDROW PICKUP ATTACHMENT

CROSS REFERENCE TO RELATED APPLICATION

This application claims the benefit of U.S. Provisional Application Ser. No. 60/059,069, filed Sep. 16, 1997, and entitled "Windrow Pickup Attachment for Forage Harvester".

FIELD OF THE INVENTION

The present invention relates generally to crop gathering headers for forage harvesting machines and more particularly to an improved reel drive assembly for windrow pickup attachments.

BACKGROUND OF THE INVENTION

The well known agricultural practice of forage harvesting consists of cutting either green or mature crop material into discrete particles, and conveying the particles from the field to a storage facility, such as a silo. While in storage the crop material undergoes an acid fermentation to give the particles an agreeable flavor and to prevent spoilage. This overall operation, which is commonly referred to as an ensilage process, converts standing crop in the field to livestock feed, generally called silage.

An essential piece of farm machinery used for producing silage is the forage harvester which is adapted to gather standing or windrowed crop material from the field, chop it into small particles and then convey the cut crop material to a temporary storage receptacle, such as a wagon. Harvesters of this type are either self propelled or pulled by a tractor. Typically, forage harvesters comprise a base unit having a rotary cutter having a generally cylindrical configuration with knives peripherally mounted to cooperate with a stationary shear bar for cutting material by a shearing action as it is passed across the surface of the bar. The chopped crop material is then discharged from the harvester through a spout which directs the flow of crop material to a wagon towed behind or along side the harvester. U.S. Pat. No. 4,223,846, issued Sep. 23, 1980 in the name of E. H. Priepke et al, shows a self propelled forage harvester that has a general configuration that is typical of prior art base units.

Forage harvesters, regardless of the type, i.e., both self propelled or pull type, have a crop gathering attachment that initially encounters crop material, as the harvester moves across the field. As mentioned above, the crop being harvested is either standing, such as row crops, or laying in the field, such as grass raked into a windrow. In the case of windrowed crop, a pickup attachment, extending from the front of the harvester, typically includes a reel consisting of a plurality of fingers, each of which is moveable through a predetermined path for engaging and picking up the windrowed crop material from the ground. The fingers urge the crop material rearwardly over side-by-side stripper plates that define slots through which the fingers extend. The stripper plates terminate in the general vicinity of a transverse auger that consolidates the crop material and feeds it through a rear opening in the header to the base unit of the harvester for processing. A typical forage harvester windrow pickup attachment is shown in U.S. Pat. No. 4,495,756, issued on Jan. 29, 1985 in the name of J. G. Greiner, et al, hereby incorporated by reference.

In present day forage harvester operations there is a need for a pickup attachment having an increased operational width to augment the overall output, i.e., harvesting larger quantities of crop material in less time then known prior art apparatus without having a deleterious affect on cost, reliability and durability. To this end, the present invention is directed to an improved windrow pickup attachment for forage harvesters having new and unique features for improving harvesting capabilities.

SUMMARY OF THE INVENTION

One object of the present invention is to provide a forage harvester pickup attachment having a reel drive assembly exhibiting increased width capabilities without affecting operating characteristics.

Another object of the present invention is to provide a forage harvester pickup attachment having a reliable, durable reel drive assembly with increased width capabilities.

A further object of the present invention is to provide a forage harvester pickup attachment having an array of tines, also commonly known as fingers, mounted on a plurality of transverse tine bars rotated about a multi-piece shaft assembly supported at the center for enhancing its durability.

In pursuance of these and other important objects the present invention contemplates improvements to a windrow pickup attachment for a forage harvester in which the attachment comprises a main frame positioned on the front of the forage harvester adjacent the input opening, and a transverse reel mounted on the main frame for picking up crop material from the ground. The reel includes a series of tines and a plurality of stripper plates, the tines projecting outwardly between the stripper plates for engaging crop material and urging it upwardly and rearwardly along the stripper plates. The attachment also includes a conveyor mounted on the main frame for receiving crop material from the reel along the stripper plates. The conveyor comprises an auger located rearwardly of the reel for consolidating crop material under conditions where it is urged rearwardly by the reel. The conveyor further comprises means for feeding the consolidated crop material to the crop processing means via the input opening. More particularly, the invention contemplates a drive shaft for the reel assembly including a pair of outwardly disposed rigid elements affixed to an intermediate rigid element, drive means coupled to one of the outwardly disposed rigid elements for rotating the drive shaft, opposing bearing assemblies for supporting the drive shaft on the main frame, the bearing assemblies being disposed in the vicinity of the outer ends of the outwardly disposed rigid elements, and intermediate support means comprising a third bearing assembly disposed to support the shaft at the intermediate rigid element.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
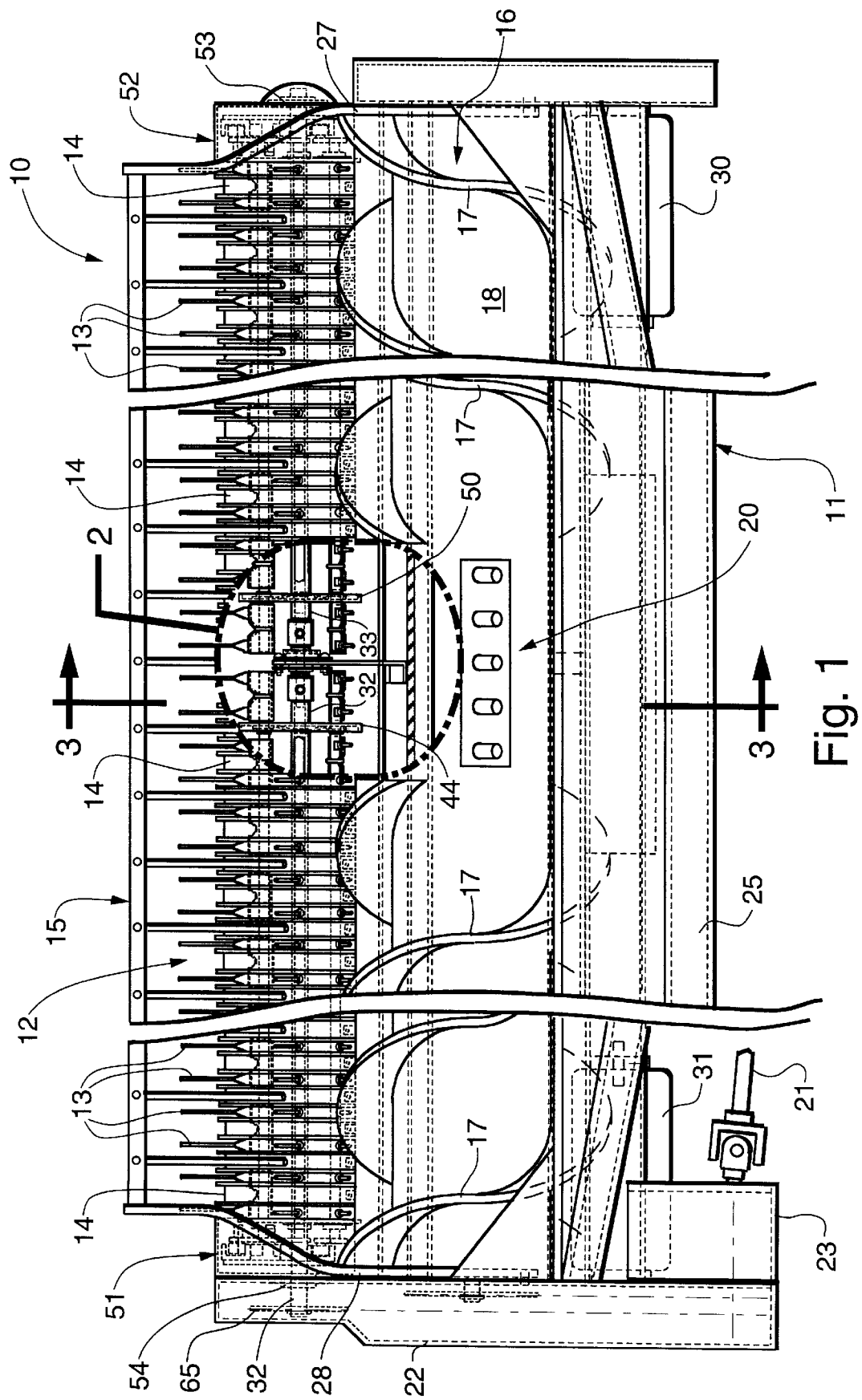
FIG. 1 is a plan view of a windrow pickup attachment adapted for being mounted on a forage harvester. The general location of various elements of the preferred embodiment of the present invention is identified by circle "2".

Referring now to the drawings for a more detailed description of one embodiment of the present invention, FIG. 1 shows a windrow pickup attachment, generally referred to by reference numeral 10, that is readily adaptable for mounting on the front end of a forage harvester, as illustrated in U.S. Pat. No. 45,495,756, referred to above. Additionally, it should be noted that to the extent that the structure of the present invention is directed to commonly known elements of a windrow pickup attachment for forage harvesting machines, the structure of the '756 patent is incorporated by reference.

Attachment 10 comprises a frame 11, a pick-up reel 12, mounted on the frame, with conventional rotatable tines 13 operatively extending between stripper plates 14 for lifting windrowed crop material from the ground and urging it rearwardly over stripper plates 14 in a manner well known in the art. A wind guard 15 for restricting upward movement of the crop is pivotally mounted forward of an auger 16 also mounted on frame 11.

The auger comprises flighting 17 extending from tube 18, and centrally located retractable fingers 20. Auger 16 is operable to convey crop through a central opening in the rear wall of attachment 10 towards feed rolls (not shown) mounted in the vicinity of an input opening disposed on the face of the base unit (not shown) of the forage harvester on which the attachment is mounted. In a conventional manner, the feed rolls of the base unit receive the crop material conveyed through the opening and feed it to a rotating cutter assembly (also not shown) in the base unit for processing. Drive to reel 12 and auger 16 is accomplished via PTO 21 and conventional drive elements enclosed in housings 22, 23, some of which are shown in phantom outline.

It should be noted that flighting 17 of auger 16 comprises oppositely wound sections on the opposing ends of tube 18 for consolidating the gathered crop material at a central region of auger 16 under conditions where auger 16 is being rotated by drive elements also enclosed in housings 22, 23. Retractable fingers 20 disposed at the central region of auger 16 are operable to project into the gathered crop and propel it rearwardly towards the opening in the rear wall whereupon feed rolls in the harvester base unit engage the crop and continue to convey it rearwardly as mentioned above.

Figure 2:
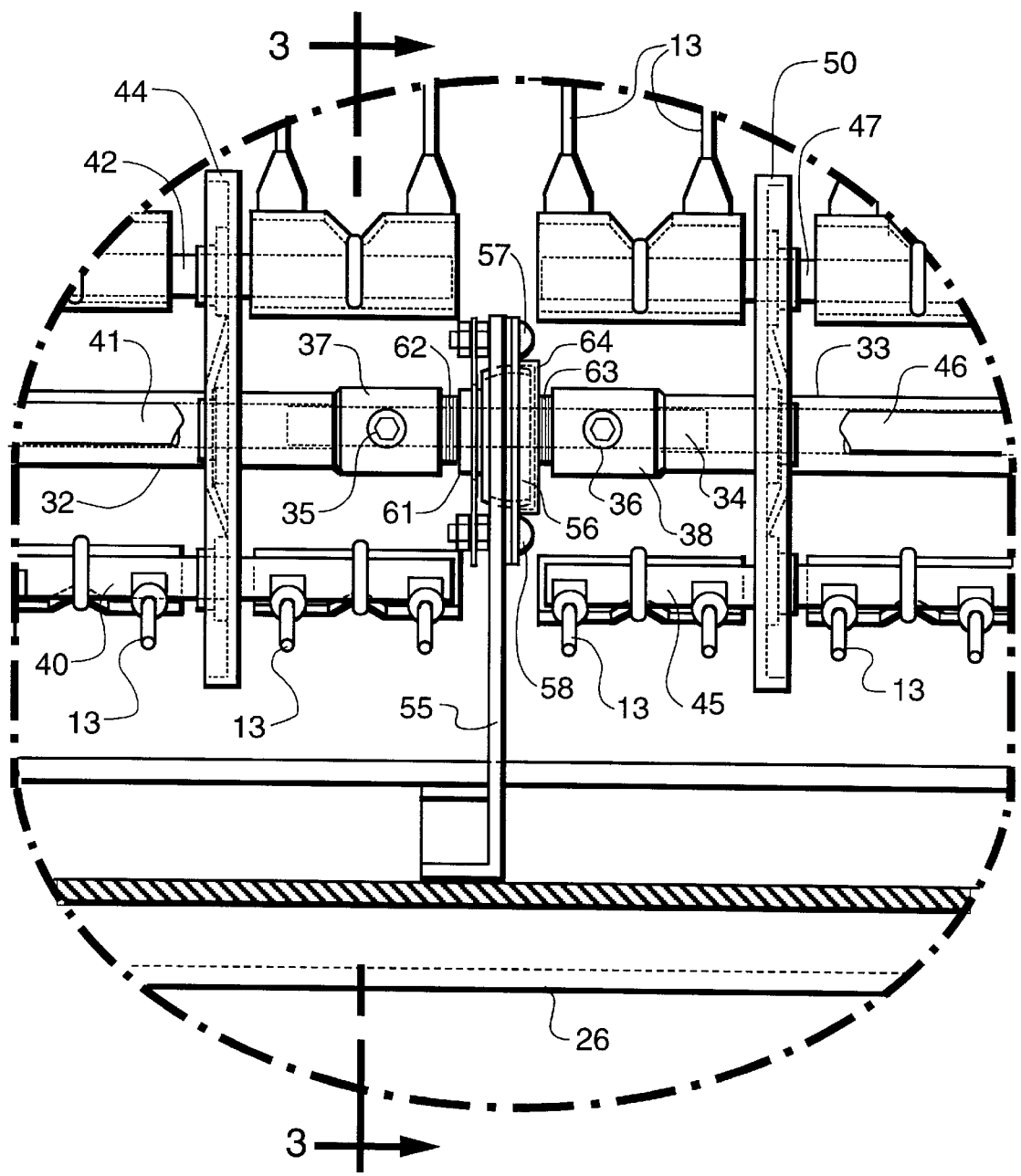
FIG. 2 is a plan view showing an enlargement of the area identified by circle "2" in FIG. 1.
Figure 3:
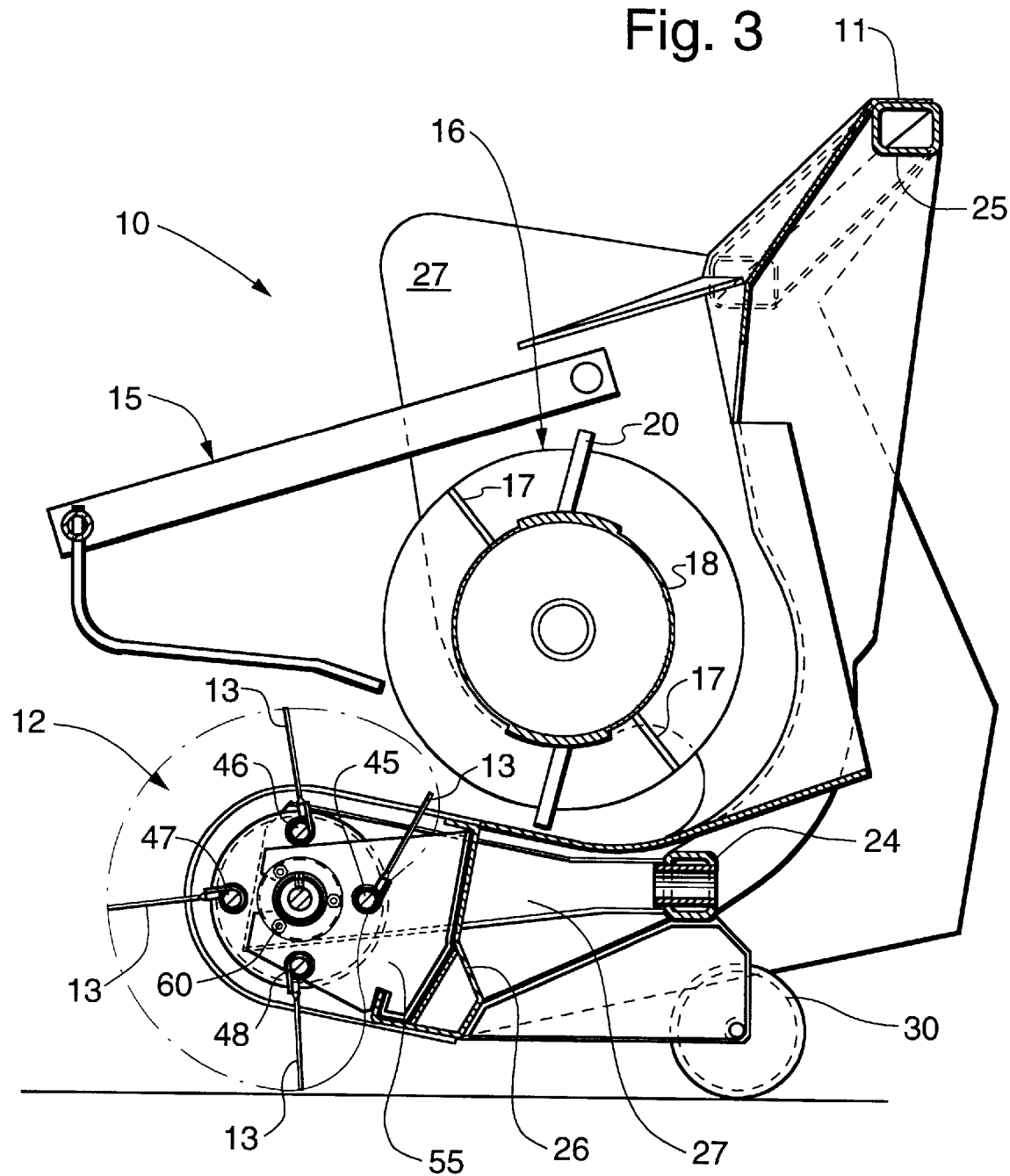
FIG. 3 is a cross sectional view taken in the direction of arrows 3—3 in FIGS. 2 and 3.

Further, FIGS. 1 and 3 show main frame assembly 11, as comprising, inter alia, a transverse rear cross beam 24, a transverse upper cross beam 25, and a transverse lower cross beam 26 (also shown in FIG. 2), all of which are rigidly secured in place by opposing end wall structure 27 and 28. All the elements of the attachment, including reel 12, auger 16 and wind guard 15, are mounted on main frame assembly 11, which overall structure is supported on the ground by rollers 31, 31, during operation.

Pickup reel 12 comprises a shaft assembly having a left half shaft tube 32, a right half shaft tube 33 and an intermediate rigid shaft 34 in the form of a rod having an outer diameter such that it mates with the inner diameters of shaft tubes 32, and 33. Rigid shaft 34 is secured in place by set screws 35 and 36 extending radially through integral shoulder portions 37, 38 of shaft tubes 32, 33. A set of left tine bars 40, 41, 42, 43 are mounted in reel spider 44, which is affixed to shaft tube 32 and rotatable therewith. Similarly, a set of right tine bars 45, 46, 47, 48 are mounted in right reel spider 50, which is affixed to shaft tube 33 and rotatable therewith. The outboard ends of the tine bars are mounted in a conventional manner, i.e., left tine bars 40, 41, 43, 44 are mounted in left cam track and follower assembly 51, while right tine bars 45, 46, 47, 48 are mounted in right cam track and follower assembly 52.

Right half shaft tube 33 is journalled in reel bearing 53 mounted on right reel end support 27, and left half shaft tube 32 is journalled in left side bearing 54. Rigid shaft 34 is journalled in center bearing assembly 56 secured to center bearing support bracket 55 by bolts 57, 58, 60. Bracket 55 is affixed to lower cross beam 26 of main frame 11, in a cantilevered fashion. Bearing assembly 56 is axially maintained by locking collar 61 which is positioned by spacing washer sets 62, 63. A bearing shield 64 is secured in place by nuts on bolts 57, 58, 60.

Thus, in operation left half shaft tube 32 and right half shaft tube 33 rotate in concert when drive gear 65 (see FIG. 1) is rotated by the power train housed in housings 22, 23. The left set of tine bars 40, 41, 42, 43, held in place by spider 44 are cammed by the cam track and follower assembly 51 to move the tine tips along a predetermined path in a conventional manner to urge crop material along stripper plates 14. Right half shaft tube 33 moves the right tine bars 45, 46, 47, 48 in the same manner to operate the tines thereon. A space is provided between the inner ends of corresponding right and left tine bars , e.g., see bars 42 and 47 in FIG. 2, to assure proper clearance for central bearing support bracket 55b and the various bearing assembly components, under conditions where the tine bars are being driven by the unique shaft assembly.

Of the many implicit and explicit advantages of the present invention, one considered to be very important is the manner in which the center support for the reel obviates problems caused by the tendency of most long shafts to flex, which could result in causing the reel structure to go askew leading to bearing wear and provoking contact between the tines and the edges of the guides. In effect, by supporting the shaft in the center the structure of the present invention reduces the shaft length by half insofar as flexure is concerned. Another equally as important advantage is the simplicity with which this improvement is accomplished without sacrificing structural integrity or functionality.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

What is claimed is:

1. An improved windrow pickup attachment for a forage harvester having crop processing means including an input opening for receiving crop material, said attachment comprising a main frame positioned on the front of said forage harvester adjacent said input opening, a transverse reel mounted on said main frame for picking up crop material from the ground, said reel including a series of tines and a plurality of stripper plates, said tines projecting outwardly between said stripper plates for engaging crop material and urging it upwardly and rearwardly along said stripper plates, said reel further includes left and right groups of tine bars on which said tines are mounted, each of which groups have a like plurality of opposing tine bars generally aligned in a transverse direction, said opposing generally aligned tine bars terminate in a centrally located spaced relationship, and a conveyor mounted on said main frame for receiving crop material from said reel along said stripper plates, said conveyor comprising an auger located rearwardly of said reel for consolidating crop material under conditions where it is urged rearwardly by said reel, said conveyor further comprising means for feeding said consolidated crop material to said crop processing means via said input opening, the improvement comprising a drive shaft for said reel assembly including a pair of outwardly disposed rigid elements affixed to an intermediate rigid element, said pair of outwardly disposed rigid elements and said intermediate rigid element having a common axis, drive means coupled to one of said outwardly disposed rigid elements for rotating said drive shaft about said common axis, opposing bearing assemblies for supporting said drive shaft on said main frame, said bearing assemblies affixed in the vicinity of the outer ends of said outwardly disposed pair of rigid elements, and intermediate support means comprising a third bearing assembly disposed to support said shaft at said intermediate rigid element.

2. A windrow pickup attachment as set forth in claim 1 wherein said intermediate support means extends from said main frame between said generally aligned opposing tine bars.

3. A windrow pickup attachment as set forth in claim 2 wherein said outwardly disposed pair of rigid elements comprise a pair of axially aligned tubular shafts, the outer ends of which are journalled for rotation in said opposing bearing assemblies.

4. A windrow pickup attachment as set forth in claim 3 wherein said intermediate rigid element comprises a solid cylindrical segment coaxially aligned within a portion of the inner surfaces of said pair of axially aligned tubular shafts.

5. A windrow pickup attachment as set forth in claim 2 wherein said intermediate support means is cantilevered from said main frame, and said solid cylindrical segment is journalled for rotation in said third bearing assembly.

* * * * *